(12) United States Patent
Lindvig et al.

(10) Patent No.: US 7,784,544 B2
(45) Date of Patent: Aug. 31, 2010

(54) METHOD OF TREATING A SUBTERRANEAN FORMATION USING A RHEOLOGY MODEL FOR FLUID OPTIMIZATION

(75) Inventors: Thomas Lindvig, Houston, TX (US); Murtaza Ziauddin, Richmond, TX (US); Michael D. Parris, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 303 days.

(21) Appl. No.: 11/625,105

(22) Filed: Jan. 19, 2007

(65) Prior Publication Data

US 2007/0169932 A1 Jul. 26, 2007

Related U.S. Application Data

(60) Provisional application No. 60/761,550, filed on Jan. 24, 2006.

(51) Int. Cl.
*E21B 43/16* (2006.01)
*E21B 47/00* (2006.01)
*G06G 7/50* (2006.01)

(52) U.S. Cl. .................... 166/305.1; 166/250.01; 166/250.1; 703/10; 703/12

(58) Field of Classification Search ............. 702/6, 702/11, 12; 703/9, 10
See application file for complete search history.

(56) References Cited

U.S. PATENT DOCUMENTS

| | | | |
|---|---|---|---|
| 4,916,946 A * | 4/1990 | Cameron | 73/152.18 |
| 5,103,905 A * | 4/1992 | Brannon et al. | 166/250.1 |
| 5,562,160 A * | 10/1996 | Brannon et al. | 166/250.1 |
| 6,225,246 B1 | 5/2001 | Darcovich | |
| 6,284,810 B1 | 9/2001 | Burnham | |
| 6,339,048 B1 | 1/2002 | Santhanam | |
| 6,378,357 B1 | 4/2002 | Han | |
| 6,454,945 B1 | 9/2002 | Weigl | |
| 6,631,647 B2 | 10/2003 | Seale | |
| 6,874,353 B2 | 4/2005 | Johnson | |
| 6,884,377 B1 | 4/2005 | Burnham | |
| 6,981,549 B2 * | 1/2006 | Morales et al. | 166/250.1 |
| 7,325,607 B2 * | 2/2008 | Massingill et al. | 166/252.5 |
| 2002/0157478 A1 | 10/2002 | Seale | |
| 2002/0193344 A1 | 12/2002 | Wolf | |
| 2003/0050758 A1 * | 3/2003 | Soliman et al. | 702/6 |
| 2004/0055671 A1 | 3/2004 | Olson | |
| 2004/0149019 A1 | 8/2004 | Johnson | |
| 2005/0209836 A1 | 9/2005 | Klumpen | |
| 2005/0209866 A1 | 9/2005 | Veeningen | |
| 2005/0209912 A1 | 9/2005 | Veeningen | |
| 2005/0211468 A1 | 9/2005 | Veeningen | |
| 2005/0228905 A1 | 10/2005 | Veeningen | |
| 2005/0236184 A1 | 10/2005 | Veeningen | |
| 2006/0035790 A1 | 2/2006 | Okell | |

* cited by examiner

*Primary Examiner*—Zakiya W Bates
*Assistant Examiner*—Angela M DiTrani
(74) *Attorney, Agent, or Firm*—David Cate; Rachel Greene; Robin Nava

(57) ABSTRACT

Subterranean formation treatment methods incorporating a rheology model which enables prediction of fluid rheology properties during a treatment operation, where the foundation of the model is a description of the reaction chemistry which describes how the number of crosslinks and broken polymer linkages develops in time under the influence of crosslinkers, breakers, and/or thermally induced effects and pressure effects. In one aspect, when used as a tool for simulating the fluid viscosity, the model can help optimizing the fluid design and optional breaker schedule for a hydraulic fracturing treatment.

20 Claims, 9 Drawing Sheets

Experimental and simulated rheology for a fluid without breaker.

METHOD OF TREATING A SUBTERRANEAN FORMATION USING A RHEOLOGY MODEL FOR FLUID OPTIMIZATION

RELATED APPLICATION DATA

This application is based upon U.S. Provisional Patent Application No. 60/761,550, filed Jan. 24, 2006, and claims the benefit of the filing date thereof.

BACKGROUND

The statements in this section merely provide background information related to the present disclosure and may not constitute prior art.

This invention relates to the techniques used for stimulating hydrocarbon-bearing formations—i.e., to increase the production of oil/gas from the formation and more particularly, to a process for optimizing fluids for and monitoring fluid rheological performance during fracture stimulation treatments.

Hydrocarbons (oil, natural gas, etc.) are obtained from a subterranean geologic formation (i.e., a "reservoir") by drilling a well that penetrates the hydrocarbon-bearing formation and thus causing a pressure gradient that forces the fluid to flow from the reservoir to the well. Often, a well production is limited by poor permeability either due to naturally tight formations or due to formation damages typically arising from prior well treatment, such as drilling, cleaning etc.

To increase the net permeability of a reservoir, it is common to perform a well stimulation. A common stimulation technique is hydraulically fracturing a formation penetrated by a wellbore. Hydraulic fracturing typically consists of pumping a proppant-free viscous fluid, or pad, usually water with some fluid additives to generate high viscosity, into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing when the pumping pressure is released. The proppant suspension and transport ability of the treatment base fluid traditionally depends on the type and concentration of viscosifying agent added.

Modern fracturing technology relies on fluids that exhibit flow behavior that changes over the course of a fracturing treatment. A fracturing fluid must be viscous enough to carry the proppant through the perforations and through the fracture, and to minimize fluid loss to the formation. On the other hand, the fluid should ideally be thinner in the tubing to limit horsepower requirements and to minimize shear degradation. To facilitate an efficient clean-up, its viscosity must be reduced to an absolute minimum after the treatment is over, thus ensuring optimum fracture conductivity and well productivity. With modern fracturing technology, a single fluid can meet all of these requirements, but a successful fracturing treatment requires a careful fluid design, i.e. the fluid composition should be chosen based on formation temperature and pressure, pumping rate, pumping time, completion capacity, water quality etc. The fluid design for a fracturing treatment is traditionally determined based on both experience and laboratory testing, whereas modeling has previously only played a minor role or no role at all.

As stated above, for fracturing fluid designs, fluid compositions and breaker schedules for a fracturing job is most commonly determined by lab rheology measurements and/or experience. Models are not solely used in the determination of the gel loading, crosslinker concentration, breaker schedule etc. In some instances, fracturing simulators employing simple models such as the power law model and the Cross model are used to represent the fluid rheology. These models are regressed to the rheology data for the actual fluid being pumped, so experimental data is needed. None of these models account for the live chemistry of fracturing fluids, i.e., the fact that crosslinks are dynamically formed and broken, as well as polymer linkages that are broken by thermal degradation or degradation by oxidizers.

Further, the use of techniques to quality assure, quality control (QA/QC) the fracturing fluid real-time are not known or used at this time. QA/QC of fluids typically are conducted on a time delayed sampling—testing basis.

Therefore, the need exists for methods that can reduce the number of laboratory experiments needed, as well as techniques which enable real-time QA/QC of fracturing fluids, so that the treatment may be adjusted if needed. Techniques which achieve the above would be highly desirable, and these needs are met at least in part by the following invention.

SUMMARY OF THE INVENTION

In one aspect of the invention relates to techniques used for treating hydrocarbon-bearing formations—such as to increase the production of oil/gas from the formation and more particularly, to a process for treating a subterranean formation by optimizing fluids for and monitoring fluid placement during treatment.

In accordance with the invention, in the treatment method, a rheology model is used which enables prediction of fluid rheology properties during a treatment operation, such as a fracturing treatment. The foundation of the model is an explicit description of the reaction chemistry, which describes how the number of crosslinks and broken polymer linkages develops in time under the influence of crosslinkers, breakers, and/or thermally induced effects and pressure effects. In one aspect, when used as a tool for simulating the fluid viscosity, the model can help optimizing the fluid design and optional breaker schedule for a hydraulic fracturing treatment.

In some embodiments, the methods for treating a subterranean formation penetrated by a wellbore, involve predicting a plurality of formation treatment scenarios (fluid formulation and fluid delivery schedule) for a fluid comprising a polymer and a crosslinker. The model includes inputting a concentration of polymer and a concentration of crosslinker, inputting temperature and pressure and shear rate profiles over the course of the treatment, determining the concentration of crosslinks over the course of the treatment based upon the inputted values for concentration of polymer, concentration of crosslinker, temperature profile over the treatment period, pressure profile over the treatment period, and shear rate profile over the treatment period. The fluid rheology over the over the treatment period based on the concentration of crosslinks over the course of the treatment is then calculated. A treatment scenario which provides optimal fluid rheology properties during the course of treatment and minimal fluid viscosity after the treatment may then be selected, the fluid prepared and injected into the wellbore to treat the subterranean formation. For any of the embodiments of the invention, concentration of breaker may optionally be considered in the model as well, as well as other factors, for example, pH profiles, changes in salinity, or any other factors which may affect the rheology of the fluid, or fluids, over the course of the treatment.

In some other embodiments, the methods involve predicting a series of formation treatment scenarios for a fluid comprising a polymer and a crosslinker by inputting a concentration of polymer and a concentration of crosslinker, inputting temperature and pressure and shear rate profiles over the course of the treatment, determining the concentration of crosslinks over the course of the treatment, and then calculating the fluid rheology over the treatment period based on the concentration of crosslinks. After which, a treatment scenario is selected which provides optimal fluid rheology properties after completion of the treatment.

In yet other embodiments, the methods involve predicting a series of formation treatment scenarios for a linear fluid comprising a by inputting a concentration of polymer, inputting temperature and pressure and shear rate profiles over the course of the treatment, determining the fluid rheology over the course of the treatment by considering concentration of polymer, and temperature, pressure and shear rate profiles over the course of the treatment. Thereafter, a treatment scenario which provides optimal fluid rheology properties during the course of treatment may then be selected, the fluid prepared and injected into the wellbore to treat the subterranean formation.

In some method embodiments of the invention, the fluid rheology is determined by coupling irreversible reactions of the crosslinker and polymer with equilibrium reactions of the crosslinker and polymer as a function of time, temperature, pressure, polymer concentration, and crosslinker concentration.

Methods of the invention may be used for any subterranean formation treatments, including but not limited to fracturing treatments, acidizing treatments, wellbore cleanout operations, gravel packing operations, acid diversion treatments, and fluid loss control operations. Some methods may be used in a hydraulic fracturing simulator whereby fluid rheology is calculated to simulate the fracture placement and an optimal pumping sequence is determined.

The selection of a treatment scenario may be based upon any desired factors such as, but not limited to, incorporating a minimum amount of polymer, maximizing rheology, optimized retained conductivity, optimized clean-up, minimizing rheology or fraction, and the like.

In some embodiments, the methods can further include monitoring the stimulation treatment and evaluating the fluid performance based upon real-time monitoring. In some of these embodiments values such as fluid pumping rate and fluid travel time to a treatment zone are input into the model.

Any suitable polymers may be used in fluids used according to the invention, including guar, hydropropyl guar (HPG), carboxymethyl guar (CMG), carboxymethylhydroxypropyl guar, cellulose, hydroxyethylcellulose (HEC), hydroxypropylcellulose (HPC), carboxymethylhydroxyethylcellulose (CMHEC), xanthan, diutan, whelan gum, polyacrylamide, polyacrylate polymers. Preferable crosslinkers, when used, are zirconium, titanium or borate based crosslinkers. In some preferred instances, the concentration of polymer ranges from about 15 to about 40 pounds per thousand gallons of treatment fluid, while in some other preferred embodiments the polymer is incorporated from about 1 to about 10 pounds per thousand gallons.

BRIEF DESCRIPTION OF THE DRAWINGS

The invention may be understood by reference to the following description taken in conjunction with the accompanying drawings.

FIG. 1 illustrates the ratio of partially crosslinked fluid viscosity to fully crosslinked fluid viscosity as a function of the crosslink concentration.

DETAILED DESCRIPTION OF THE INVENTION

Figure 1:
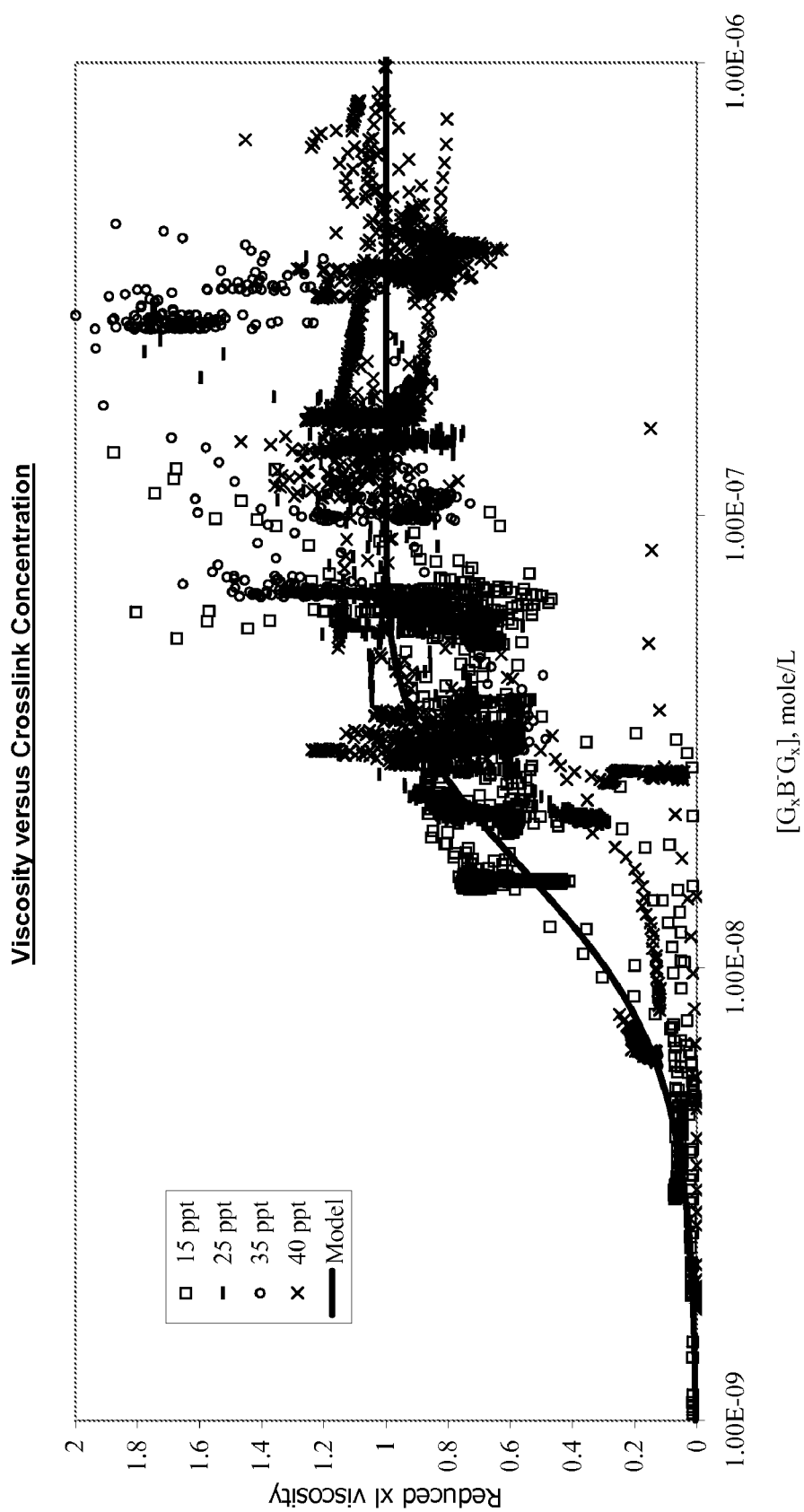
FIG. 1 show the viscosity reduced by the viscosity at complete crosslink as a function of the crosslink concentration.
Figure 2:
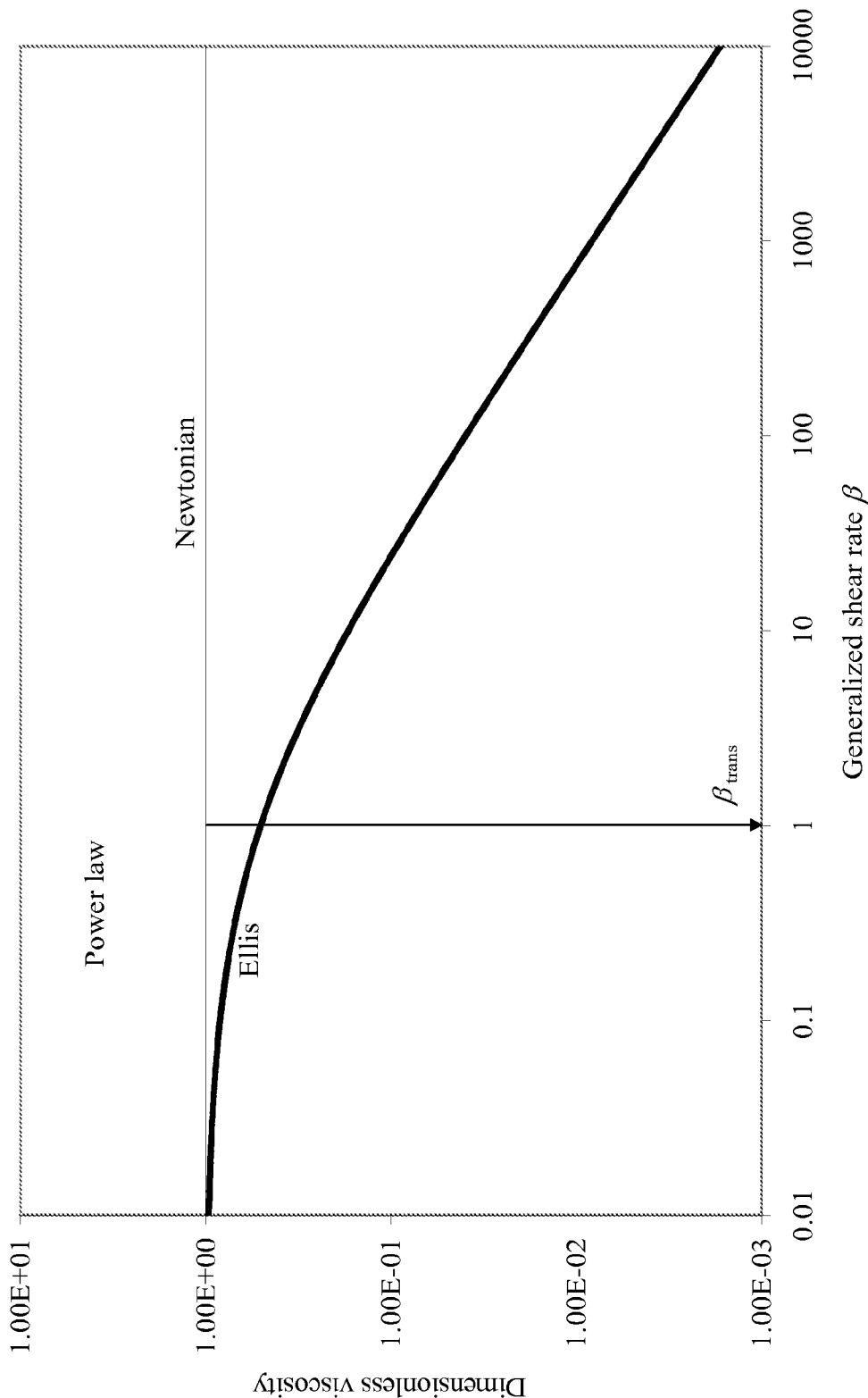
FIG. 2 illustrates dimensionless crosslinking viscosity increment as a function of the generalized shear rate where the transition between Newtonian and power law behavior occurs at a generalized shear rate of 1.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions used in methods of the invention may be described herein as comprising certain materials, it should be understood that the composition could optionally comprise two or more chemically different materials. In addition, the composition can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

As used herein, the phrases "fully crosslinked" and "completely crosslinked" means a polymer/crosslinker system which has effectively developed the maximum practical viscosity under the particular conditions of use, unless indicted otherwise or clear from the context within which the term is used. Unless otherwise indicated, the term "treatment scenario" means the fluid formulation and treatment schedule for the fluid as used to treat a subterranean formation. The term "rheology" in the broadest sense of the term, that part of mechanics which deals with the relation between force and deformation in material bodies. The nature of this relation depends on the material of which the body is constituted. It is customary to represent the deformation behavior of fluids by the model of the linear viscous or newtonian fluid (displaying the property known as viscosity). These classical models are, however, inadequate to depict certain nonlinear and time-dependent deformation behavior that is sometimes observed. It is these nonclassical behaviors which are to as rheological behavior, or rheology. Rheological behavior is particularly readily observed in materials containing polymer molecules which typically contain thousands of atoms per molecule.

This invention relates to the techniques used for treating hydrocarbon-bearing formations—such as to increase the production of oil/gas from the formation and more particularly, to a process for treating a subterranean formation by optimizing fluids for and monitoring fluid placement during treatment. Subterranean formation treatments include, but are not limited to, fracturing, acidizing, wellbore cleanout, gravel packing, acid diversion, fluid loss control, and the like. Methods of the invention employ a rheology model that directly describes the chemical reactions that occur in a crosslinked viscosifying agent based treatment fluid. One example of such a fluid is a borate-crosslinked guar-based fracturing fluid.

The methods of the invention are useful for subterranean formation treatment, which also includes a wellbore penetrating the formation, and include such methods as treatment fluid design, breaker schedule design, rheology representation in treatment simulators, and even real-time QA/QC of treatment fluid rheology. Preferably, the embodiments of the invention are fracturing methods which include design of the fracturing fluid, design of the fracturing treatment, injection of the fracturing fluid into the wellbore, stimulating the formation, and monitoring/optimizing the fluid/treatment based upon real-time monitoring.

Methods of the invention incorporate models for such tasks as fluid design, breaker schedule design, rheology representation in treatment simulators, such as fracturing simulators, and the like. The novelty of the models is its direct link between the live fracturing fluid chemistry and its rheology. One aspect in the model is the conversion from the crosslink concentration, which is delivered by the chemistry part of the model, to the viscosity. The viscosity (y) is related to the crosslink concentration [GxB-Gx], mole/L (x) via an s-shaped $y=c_1(1-sec(c_2 x))$ function, characterized by three regions. As the crosslink concentration is gradually increased, the fluid passes through three distinct rheology regimes, as shown in FIG. 1, and as explained below.

In the following, the characteristics of the three regimes will be described along with molecular and electrostatic explanation for the viscosity behavior:

Regime 1: The weakly crosslinked regime. The limited attraction caused by the low density of intermolecular crosslinks is easily overcome by the shear stress, i.e., the molecules are separated by the fluid flow and the viscosity increase therefore remains low.

Regime 2: The transition region. The number of intermolecular crosslinks increases and the number of overlaps that have sufficiently high attraction energy to withstand the shear stress exerted by the flow increases. The resistance to flow, or the viscosity, therefore increases rapidly with the crosslink density.

Regime 3: Most of the overlaps have sufficiently high density of intermolecular crosslinks to resist the shear stress exerted by the flow. A further increase of the crosslink density has only limited effect on the fluid viscosity.

The target regime for a typical borate crosslinked guar-based fracturing fluids is regime 3, where the viscosity is fully developed and the fluid is robust, i.e., the viscosity is relatively insensitive to changes in the crosslink concentration.

While some fluids used in treatment methods of the invention are borate-crosslinked guar-based fracturing fluids, the fluids may be any crosslinked polymer based fluids, or linear polymer based fluids, used for treating a subterranean formation. The fluids typically include a polymer viscosifying agent and a crosslinker. Non-limiting examples of polymer viscosifiers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethyl-cellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. Synthetic polymers such as, but not limited to, polyacrylamide and polyacrylate polymers and copolymers are used typically for high-temperature applications. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described published U.S. pat. app. No. U.S. 2004209780, Harris et. al.

When incorporated, the polymer viscosifier may be present at any suitable concentration. In various embodiments hereof, the viscosifying agent can be present in an amount of up to less than about 60 pounds per thousand gallons of liquid phase, or from about 15 to less than about 40 pounds per thousand gallons, from about 15 to about 35 pounds per thousand gallons, 15 to about 25 pounds per thousand gallons, or even from about 17 to about 22 pounds per thousand gallons. Generally, the viscosifying agent can be present in an amount of from about 1 to less than about 50 pounds per thousand gallons of liquid phase, with a lower limit of polymer being no less than about 1, 2, 3, 4, 5, 6, 7, 8, 9, 10, 11, 12, 13, 14, 15, 16, 17, 18, or 19 pounds per thousand gallons of the liquid phase, and the upper limited being less than about 50 pounds per thousand gallons, no greater than 59, 54, 49, 44, 39, 34, 30, 29, 28, 27, 26, 25, 24, 23, 22, 21, or 20 pounds per thousand gallons of the liquid phase. In some embodiments, the polymers can be present in an amount of about 20 pounds per thousand gallons. Hydroxypropyl guar, carboxymethyl hydroxypropyl guar, carboxymethyl guar, cationic functional guar, guar or mixtures thereof, are preferred polymers for use herein as a gelling agent. Fluids incorporating polymer viscosifiers may have any suitable viscosity depending upon the particular needs of a given operation. For many operations, the fluids preferably have a viscosity value of about 50 mPa-s or greater at a shear rate of about 100 s$^{-1}$ at treatment temperature, more preferably about 75 mPa-s or greater at a shear rate of about 100 s$^{-1}$, and even more preferably about 100 mPa-s or greater. In the case of a slickwater fracturing, also commonly referred to as a water fracture operation, the fluid may have suitably low, but effective, viscosity values, and low polymer loadings, preferably less than about 15 pounds per thousand gallons, more preferably from about 1 to about 10 pounds per thousand gallons.

Incorporating crosslinkers into the fluids further augments the viscosity of the treatment fluid. Crosslinking consists of the attachment of two polymeric chains through the chemical association of such chains to a common element or chemical group, whereas such element or group is referred to as the crosslinker. Typical crosslinkers are polyvalent metal ions, more often zirconium or titanium ions, or borate ions. Crosslinking is very sensitive to the prevailing pH. For example, crosslinking with borate ions can be performed only in alkaline media (pH>8). pH-regulating systems ("buffers") are often required to achieve effective crosslinking with metal ions.

Fluids used in the invention may be based upon and aqueous or nonaqueous medium, or even gelled oil. When the fluid is based upon an aqueous medium, the medium may be water or brine. In those embodiments of the invention where the aqueous medium is a brine, the brine is water comprising inorganic salts and/or organic salts. Preferred inorganic salts include alkali metal halides, more preferably potassium chloride. The carrier brine phase may also comprise an organic salt more preferably sodium or potassium formate. Preferred inorganic divalent salts include calcium halides, more preferably calcium chloride or calcium bromide. Sodium bromide, potassium bromide, or cesium bromide may also be used. The salt is chosen for compatibility reasons i.e. where the reservoir drilling fluid used a particular brine phase and the completion/clean up fluid brine phase is chosen to have the same brine phase.

A fiber component may be included in the fluids of the invention to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be include at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Fluids used in accordance with the invention may also comprise a breaker. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker, the borate anion, reversibly create the borate crosslinks. Lowering the pH can just as easily eliminate the borate/polymer bonds. At a high pH above 8, the borate ion exists and is available to crosslink and cause gelling. At lower pH, the borate is tied up by hydrogen and is not available for crosslinking, thus gelation caused by borate ion is reversible.

Fluids used in methods of the invention may further contain other additives and chemicals that are known to be commonly used in oilfield applications by those skilled in the art. These include, but are not necessarily limited to, materials such as surfactants, foaming agents, crosslinking delay agent, breaker delay agents, particles, proppants, gas component, breaker aids, oxygen scavengers, alcohols, scale inhibitors, corrosion inhibitors, fluid-loss additives, bactericides, friction reducers, latexes, emulsions, emulsifiers, and the like.

FIG. 1 illustrates the ratio of partially crosslinked fluid viscosity to fully crosslinked fluid viscosity as a function of the crosslink concentration. The method of obtaining the crosslink density is described herein below. The transition between low and high viscosity occurs in the crosslink concentration range from about $5 \times 10^{-9}$ to about $5 \times 10^{-8}$ mole/L, so a fracturing fluid, for example, may be designed to have a concentration equal to or greater than about $5 \times 10^{-8}$ mole/L to have fully developed viscosity, given the bottom hole and pumping conditions. The scatter of the data at the plateau is caused in by experimental uncertainty and, in part, by the simplified method used to calculate the viscosity at full crosslink.

Harris (P. C. Harris. Chemistry and rheology of borate-crosslinked fluids at temperatures to 300° F. Society of Petroleum Engineers, SPE 24339:285-293, 1992, and P. C. Harris. Chemistry and rheology of borate-crosslinked fluids at temperatures 300° F. Journal of Petroleum Technology, March: 264-269, 1993.) performed a qualitative study of how the borate equilibrium affects the crosslinking chemistry. Mesmer et al. (R. E. Mesmer, C. F. Baes, and F. H. Sweeton. Acidity measurements at elevated temperatures. VI. Boric acid equilibria. Inorganic chemistry, 11(3):537-543, 1971) studied the boric acid equilibria and provided and related the dissociation quotient to the ionic strength and temperature. More recently, Pezron et al. (E. Pezron, A. Ricard, F. Lafuma, and R. Audebert. Reversible gel formation induced by ion complexation. 1. borax-galactomannan interactions. Macromolecules, 21:1121-1125, 1988) and Bishop et al. (M. Bishop, N. Shahid, J. Yang, and A. R. Barron. Determination of the mode and efficacy of the cross-linking of guar by borate using MAS 11B NMR of borate cross-linked guar in combination with solution 11B NMR of model systems. Dalton Trans., pages 2621-2634, 2004.) studied the guar-borate reactions by NMR-spectropscopy and quantified the equilibrium quotient of the crosslinking reactions. These equilibrium quotients can be coupled to provide an evaluation of the crosslink density, which is among the main determinants of the fluid rheology. The result is a model that enables a prediction of how the viscosity may depend on the overall gel composition and its exposure history. A model is show as follows, as well as the performance of the model. The above references are incorporated by reference thereto.

One embodiment of a model useful in the invention separates the viscosity into contributions from the solvent (s), the linear guar (lg) and crosslinking (xl):

$$\eta = \eta^s + \eta^{lg} + \eta^{xl} \quad (1)$$

This functionality ensures that the model reduces to the correct limits when crosslinking and/or gel concentration vanishes.

The solvent viscosity is calculated from a correlation that is fitted to water viscosity data from the CRC handbook (Lide, 2005):

$$\ln \eta^s = -3.51 + \frac{500}{T - 151} \quad (2)$$

where T is the absolute temperature in K and ηs is the solvent viscosity in cP. The pressure dependence of the solvent (i.e. water) viscosity is small compared to the crosslinked gel and is not considered here.

The linear-gel viscosity is calculated by the Ellis-type model:

$$\frac{\eta_0^{lg}}{\eta^{lg}} = 1 + \frac{1}{285 \beta^{-0.76}} \quad (3)$$

where $\eta_0^{lg}$ is the zero-shear viscosity of the linear guar and β is the so-called generalized shear rate:

$$\beta = \dot{\gamma} (\eta_0^{lg} - \eta^s) \frac{M}{cRT} \quad (4)$$

where, in turn, $\dot{\gamma}$ is the shear rate, M is the polymer molecular weight, c is the gel concentration (mass/volume) and R is the universal gas constant. The zero-shear viscosity is calculated by a method which relates the specific viscosity to the product between the hydrodynamic volume (intrinsic viscosity) and the gel concentration through:

$$\ln \frac{\eta_0^{lg} - \eta^s}{\eta^s} = \begin{cases} 0.429 + 1.61 \ln(c[\eta]) & \text{for } c[\eta] < 3.37 \\ -3.27 + 4.66 \ln(c[\eta]) & \text{for } c[\eta] \geq 3.37 \end{cases} \quad (5)$$

This function is continuous but not smooth. The physical explanation for this is that the concentration dependence is stronger above the overlap concentration than below. The intrinsic viscosity is calculated by the Mark-Houwink equation:

$$[\eta] = KM^\alpha \quad (6)$$

with the following temperature dependent parameters:

$$\ln K = -6.05 - \frac{1.29 \cdot 10^3}{T} \quad (7)$$

$$a = 0.55 + \frac{1.04 \cdot 10^2}{T} \quad (8)$$

where the temperature is in K and the intrinsic viscosity in dl/g. The pressure dependence of the linear guar viscosity is small compared to the crosslinked gel is not considered here.

The fluid viscosity related to crosslinking is established by first calculating the chemical contribution at a reference shear rate, followed by a shear-rate correction by an Ellis-type rheology model. 100 s$^{-1}$ is picked here as the reference shear rate. The chemical contribution at the reference shear rate is given by:

$$\eta_{ref}^{xl} = Q_1 c[\eta] \left( 1 - \text{sech}\left( 1.360 \frac{[XL]}{[XL]_{trans}} \right) \right) \quad (9)$$

where $Q_1$ is an empirical parameter and [XL]trans is the crosslink concentration at which the viscosity is half of that at complete crosslinking. The parameters were regressed to experimental viscosity data and are listed in table 1.

TABLE 1

Parameters in the rheology model.

| Parameter | Value | Unit | Related to |
|---|---|---|---|
| $Q_1$ | 1.173E+02 | cP | Viscosity calculation, equation 10 |
| $[XL]_{trans}$ | 1.539E−08 | mole/L | |
| $H^{II}$ | −2.080E+04 | J/mole | 1st complexation reaction. |
| $S^{II}$ | −6.050E+01 | J/mole/K | Equilibrium constant given by equation 23 |
| $H^{III}$ | −2.060E+04 | J/mole | Crosslinking. Equilibrium constant given by equation 24 |
| $S^{III}$ | −6.800E+01 | J/mole/K | |
| $k_0^{IV}$ | 4.652E+02 | min$^{-1}$ | Thermal degradation of the polymer linkages. Reaction rate given by equation 26 |
| $E_a^{IV}$ | 6.372E+04 | J/mole | |
| $k_1^{IV}$ | 6.015E+12 | L/mole | |
| $k_0^V$ | 5.587E+05 | min$^{-1}$ | Gradual pH reduction modelled as acid release. Acid release rate given by equation 27 |
| $E_a^V$ | 2.038E+04 | J/mole | |
| $c_{HAc}$ | 1.173E−04 | mole/g | |
| $k_0^{VII}$ | 4.297E+16 | min$^{-1}$ | Thermally induced persulfate decomposition. Reaction rate given by equation 28. |
| $E_a^{VII}$ | 1.249E+05 | J/mole | |
| $k_0^{VIII}$ | 8.142E+04 | L/mole/min | Persulfate decomposition catalyzed by triethylamine. Reaction rate given by equation 29 |
| $E_a^{VIII}$ | 1.325E+04 | J/mole | |
| $k_0^{IX}$ | 3.253E+45 | L/mole/min | Break of the polymer linkages caused by persulfate radicals. Reaction rate given by equation 30 |
| $E_a^{IX}$ | 3.003E+05 | J/mole | |

Although the functionality of equation 9 is empirical, there is strong evidence that the gel viscosity first increases dramatically then stabilizes when gradually increasing the crosslink concentration. This is well described by the 1-sech (f([XL])) functionality, but a further improved scaling with temperature and gel loading is achieved when introducing the product c[η] in equation 9. It is seen from equation 9 that $\eta_{ref}^{xl}$ approaches $Q_1 c[\eta]$ asymptotically when the crosslink concentration exceeds the transition crosslink concentration. The actual composition, and thereby also the concentration of crosslinks, is a complex function of the overall composition (gel load, crosslinker concentration, breaker concentration, etc.), temperature and time, and is governed by a set of chemical reactions.

In one embodiment, the chemistry of borate-crosslinked guar-based fluids is represented by a simple model that considers the crosslinking-related reactions to be at equilibrium. The key constituents are assumed to be H$^+$, OH$^-$, boric acid B(OH)$_3$, borate B(OH)$_4^-$, crosslink sites located on the gallactose groups of the polymer $G_x$, connections between crosslink sites formed by borate (crosslinks) $G_xB^-G_x$, The equilibrium distribution between these components can be calculated by a Gibbs Energy Minimization, as described by Smith and Missen, Chemical Reaction Equilibrium Analysis: Theory and Algorithms. Krieger, 1982, incorporated herein by reference thereto, or by solving a set of equilibrium quotient equations coupled with element balances. An independent set of chemical reactions that equilibrates the assumed instantaneously equilibrating species is:

Reaction I: $B(OH)_3 + OH^- \rightleftharpoons B(OH)_4^- (=B^-)$ (10)

Reaction II: $B^-G_x \rightleftharpoons B^-G_x$ (11)

Reaction III: $G_x + B^-G_x \rightleftharpoons G_xB^-G_x (=XL)$ (12)

The gel degrading reactions, on the other hand, occur relatively slowly and are therefore modeled by kinetic reactions. Gel degradation occurs rapidly in the presence of breakers, but the gel also degrades by thermally induced hydrolysis, which breaks the acetal linkages between the mannose units (backbone) and between the mannose and galactose side chains. Denoting an acetal linkage by LL, we describe this effect by the reaction:

Reaction IV: $LL \rightarrow 2L$ (13)

In addition to reaction (4), some viscosity loss may be attributed to a gradual reduction of the pH. In the framework of the model, this is described by considering the guar to contain an organic acid that is gradually released to the solution:

Reaction V: $GHAc \rightarrow G + HAc$ (14)

The organic acid may then displace the borate equilibria, equation 10, towards boric acid by consuming hydroxyl ions:

Reaction VI: $HAc + OH^- \rightleftharpoons Ac^- + H_2O$ (15)

Finally, the gel degradation caused by persulfate breakers occurs in two stages, first by persulfate decomposition, then by an attack of sulfate radicals on the polymer linkages. At high temperatures, the persulfate decomposes into two sulfate radicals:

Reaction VII: $SS \rightarrow 2S$ (16)

At low temperatures, this reaction is slow, and breaker aid may be added. The breaker aid is a solution of triethanol amine (TEA), which acts as a catalyst for the decomposition:

Reaction VIII: $SS + TEA \rightarrow 2S + TEA$ (17)

The sulfate radicals generated in reaction VII and VIII then attack the acetal bonds between the sugar units in the polymer:

Reaction IX: $S + LL \rightarrow SL + L$ (18)

In this reaction, either SL or L may be a radical, which is in reality capable of attacking another LL, creating another radical, etc. This chain reaction will propagate until termination, which occurs when two radicals meet and react. The propagation and termination of the chain reaction has been omitted in the current version of the model, which therefore lumps the entire breaker effect into reactions (VII), (VIII) and (IX). During gel degradation, the number-average molecular weight can be calculated as the total weight divided by the total number of molecules, which gives:

$$M^{x1} = \frac{n_0^{1g} M^{1g}}{n_0^{1g} + \frac{n_{LL}}{2} - n_{x1}} = \frac{c_0 M^{1g}}{c_{1g} + \frac{[LL]}{2} - [XL]}$$ (19)

where n is the mole number, c is the molar nominal concentration and subscript 0 indicates that the quantity refers to the linear, non-broken polymer. This formula assumes that all crosslinks are intermolecular. The total number of molecules in the denominator appears by realizing that each (intermolecular) crosslink reduces the number of polymer segments by one and that each broken acetal linkage LL increases the number of polymer segments by one. The change in the molecular weight caused by crosslinking and gel degradation thus affects $\eta^{xl}_{ref}$ through [XL] and [$\eta$] (see equation 9). The actual composition, including the crosslink concentration, then becomes a time-dependent functional governed by the array of component chemical potentials and reaction rates for reactions I through IX. The equilibrium factors are given by:

$$K^I = \frac{[B^-]}{[B(OH)_3][OH^-]}$$ (20)

$$K^{II} = \frac{[G_xB^-]}{[G_x][B^-]}$$ (21)

$$K^{III} = \frac{[XL]}{[G_xB^-][G_x]}$$ (22)

$$K^{VI} = \frac{[Ac^-]}{[HAc][OH^-]} = \frac{K_{a,HAc}}{K_{a,H_2O}}$$ (23)

where $K_{a,HAc}$ and $K_{a,H_2O}$ are the dissociation constants for HAc and water, respectively. The equilibrium constants are related to the reaction entropies and enthalpies through the thermodynamic relationship:

$$G = -RT \ln K$$ (24)

$$G = H - TS$$ (25)

where G is the reaction free energy, H is the reaction enthalpy and S is the reaction entropy.

The chemical potential for the crosslink complex has been back-calculated from equilibrium factors given by M. Bishop, N. Shahid, J. Yang, and A. R. Barron. Determination of the mode and efficacy of the cross-linking of guar by borate using MAS 11B NMR of borate cross-linked guar in combination with solution 11B NMR of model systems, Dalton Trans., pages 2621-2634, 2004. in terms of reaction enthalpy and entropy, incorporated herein by reference thereto. The values used are summarized in table 1.

The rates of the reactions related to the gel degradation are assumed to be first order in each of the reactants, and are described by Arrhenius-type expressions:

$$R^{IV} = k_0^{IV} \exp\left(-\frac{E_a^{IV}}{RT}\right) \frac{[LL]}{1 + k_1^{IV}[TEA]}$$ (26)

$$R^V = k_0^V \exp\left(-\frac{E_a^V}{RT}\right)[GHAc]$$ (27)

-continued $$R^{VII} = k_0^{VII} \exp\left(-\frac{E_a^{VII}}{RT}\right)[SS] \quad (28)$$

$$R^{VIII} = k_0^{VIII} \exp\left(-\frac{E_a^{VIII}}{RT}\right)[SS][TEA] \quad (29)$$

$$R^{IX} = k_0^{IX} \exp\left(-\frac{E_a^{IX}}{RT}\right)[S][LL] \quad (30)$$

where $k_0$ is the pre-exponential (frequency) factor and $E_a$ is the activation energy for each reaction. Reaction IV has been modified to account for the stabilizing effect TEA has on the gel. The time-dependence of the composition at constant volume (incompressible fluid) is then given by:

$$\frac{d[SS]}{dt} = -(R^{VII} + R^{VIII}) \quad (31)$$

$$\frac{d[S]}{dt} = (R^{VII} + R^{VIII}) - R^{IX} \quad (32)$$

$$\frac{d[LL]}{dt} = -(R^{IV} + R^{IX}) \quad (33)$$

$$\frac{d[GHAc]}{dt} = -R^V \quad (34)$$

The integration of the irreversible reactions is coupled with the equilibrium reactions to provide the actual fluid composition, including the crosslink concentration, as a function of time, temperature and pressure which is subsequently used to calculate the crosslinked gel viscosity.

The shear-dependence of the crosslinking contribution to the viscosity is described by a molecular version of the Eyring model:

$$\dot{\gamma} = A \sinh(B\tau) \quad (35)$$

where $\dot{\gamma}$ is the shear rate and $\tau$ is the shear stress. A and B are related to molecular parameters through:

$$A = 2\frac{kT}{h} \exp\left(-\frac{E_{att}}{kT}\right) \quad (36)$$

$$B = \frac{a^3}{2kT} \quad (37)$$

where $E_{att}$ is the attractive energy between two polymer coils, a is the distance between two polymer coil centers, k is Boltzmann's constant and h is Planck's constant. The attraction is dominated by the entanglements and crosslinks that are formed in the overlap regions between different polymer chains. The viscosity fix-points at the reference shear rate provided by equation 9 is matched by the following constraint:

$$A = \frac{\dot{\gamma}_{ref}}{\sinh(B\tau_{ref})} \quad (38)$$

The distance between two polymer coil centers a is calculated from the gel concentration, i.e., the shear model contains no adjustable parameters.

In dimensionless form, the Eyring model can be formulated as:

$$\bar{\eta} = \frac{\eta}{\eta_0} = \frac{\ln(\beta + \sqrt{\beta^2 + 1})}{\beta} \quad (39)$$

According to this model, the fluid viscosity is Newtonian at low shear rates and the slope of the curve slowly approaches −1 at high shear rates. The model parameters obtained for a model that uses $100 \text{ s}^{-1}$ as the reference shear rate are listed in table 1.

Formation and downhole pressure and temperature can have an impact on fluid rheology. In the case of pressure, when there is adequate pressure present in the treatment or delivery environment, the effective crosslinking functionality of a crosslinking agent, such as a borate, may be significantly reduced. Such pressures are those on the order of magnitude of $10^3$ psi or greater, such $4 \times 10^3$ psi or greater. At $4 \times 10^3$ psi, it has been unexpectedly discovered that measured viscosity is about half of the viscosity of a borate crosslinker at ambient surface pressure. Thus, the pressure affects on a borate crosslinker can be taken into account in some embodiments of the invention.

Methods of the invention may also be used to for real-time QA/QC of the fluids, thus making possible to adjust the fluid components during an operation to achieve a further optimized fluid and treatment schedule. The rheology model can be used to further extrapolate monitored surface characteristics such as viscosity, pumping rate, temperature, polymer concentration, crosslinker concentration, breaker concentration to bottomhole conditions The following example is presented to illustrate the preparation and properties of energized aqueous fluids comprising heteropolysaccharides and a surfactant, and should not be construed to limit the scope of the invention, unless otherwise expressly indicated in the appended claims. All percentages, concentrations, ratios, parts, etc. are by weight unless otherwise noted or apparent from the context of their use.

Example

The following example illustrates the methods of the invention, as described in the preferred embodiments.

Figure 3:
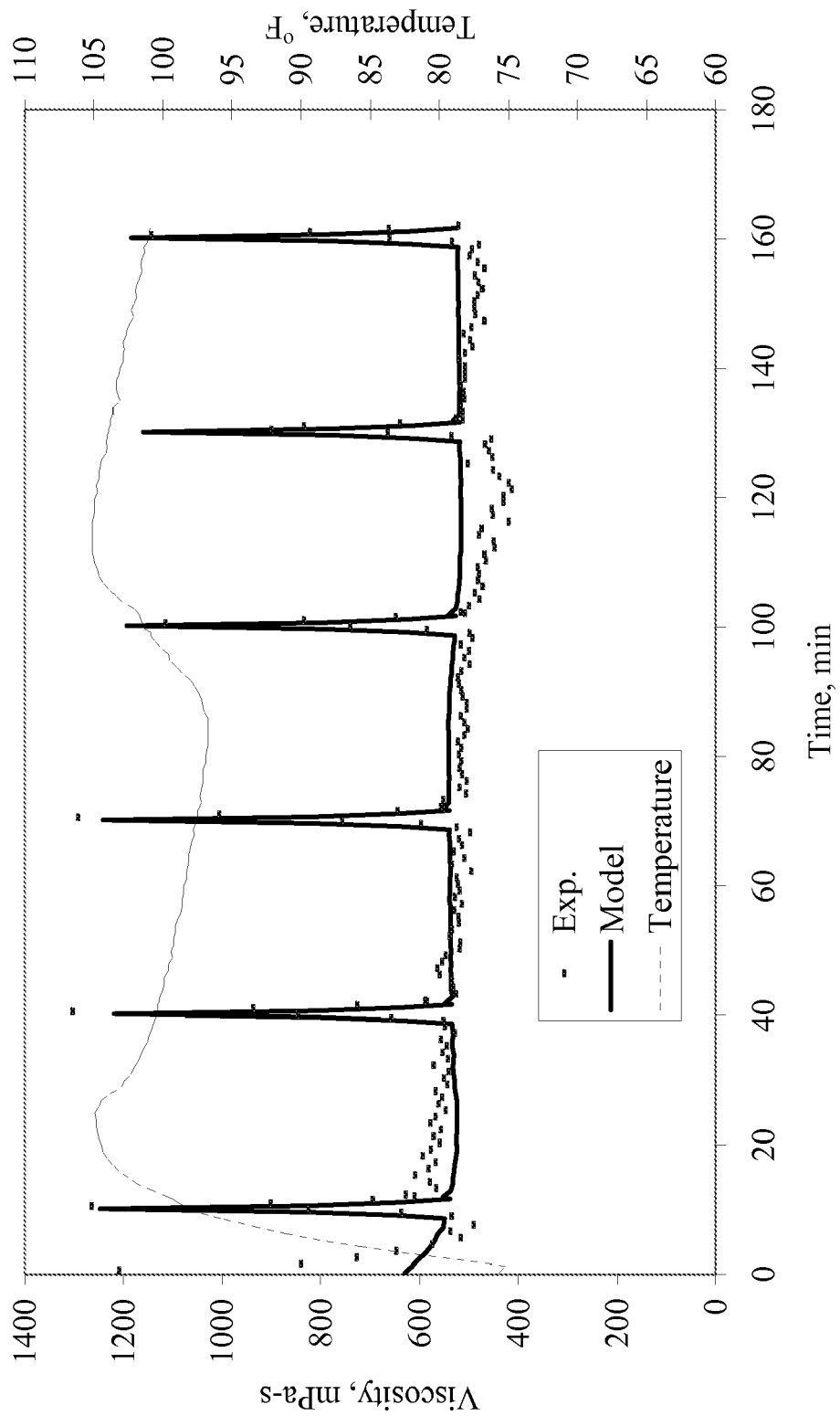
FIG. 3 shows experimental and simulated rheology for a fluid containing 20 ppt guar polymer and 3.1 gpt borate crosslinker solution, without breaker.

Viscosity predictions at reference shear rate ($100 \text{ s}^{-1}$) are made. For systems containing no breaker, the model was examined against 68 Fann 50 experiments for gels containing 15-40 ppt guar, 0.5-10.5 gpt of a 20% by weight aqueous solution of borax, and no breaker. 51 of these (84%) are successfully represented by the model. For these analyses, success criterion required that at viscosities lower than 250 mPa-s, prediction must be within 50 mPa-s of experimental data, while at higher viscosities, prediction within 20% of experimental data. The success criterion is less strict at low viscosities because of higher experimental uncertainty of the Fann 50. A performance example is shown in FIG. 3.

Figure 4:
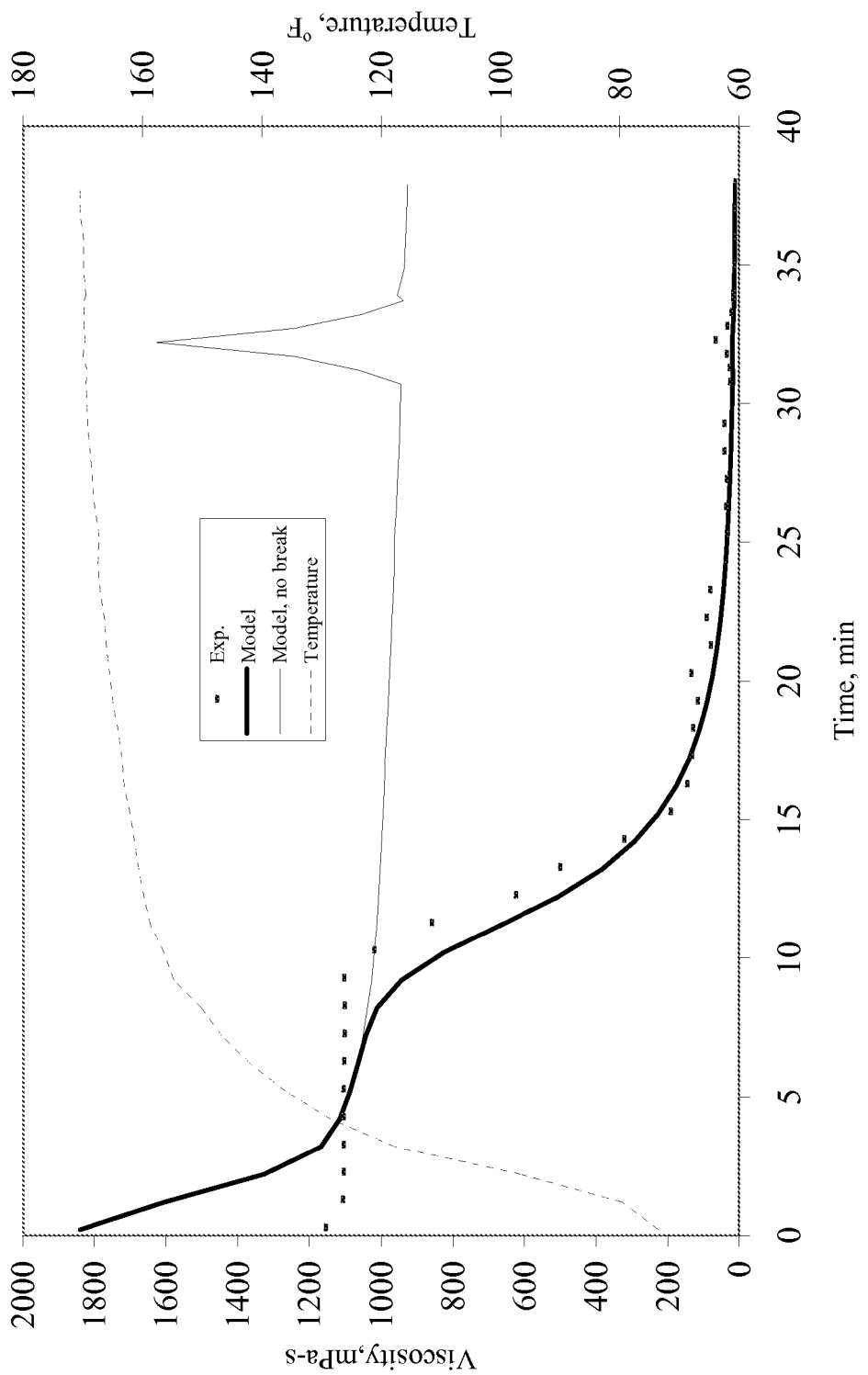
FIG. 4 illustrates experimental and simulated rheology for a fluid containing 30 ppt guar polymer, 4.4 gpt borate crosslinker solution and 2.2 ppt ammonium persulfate
Figure 5:
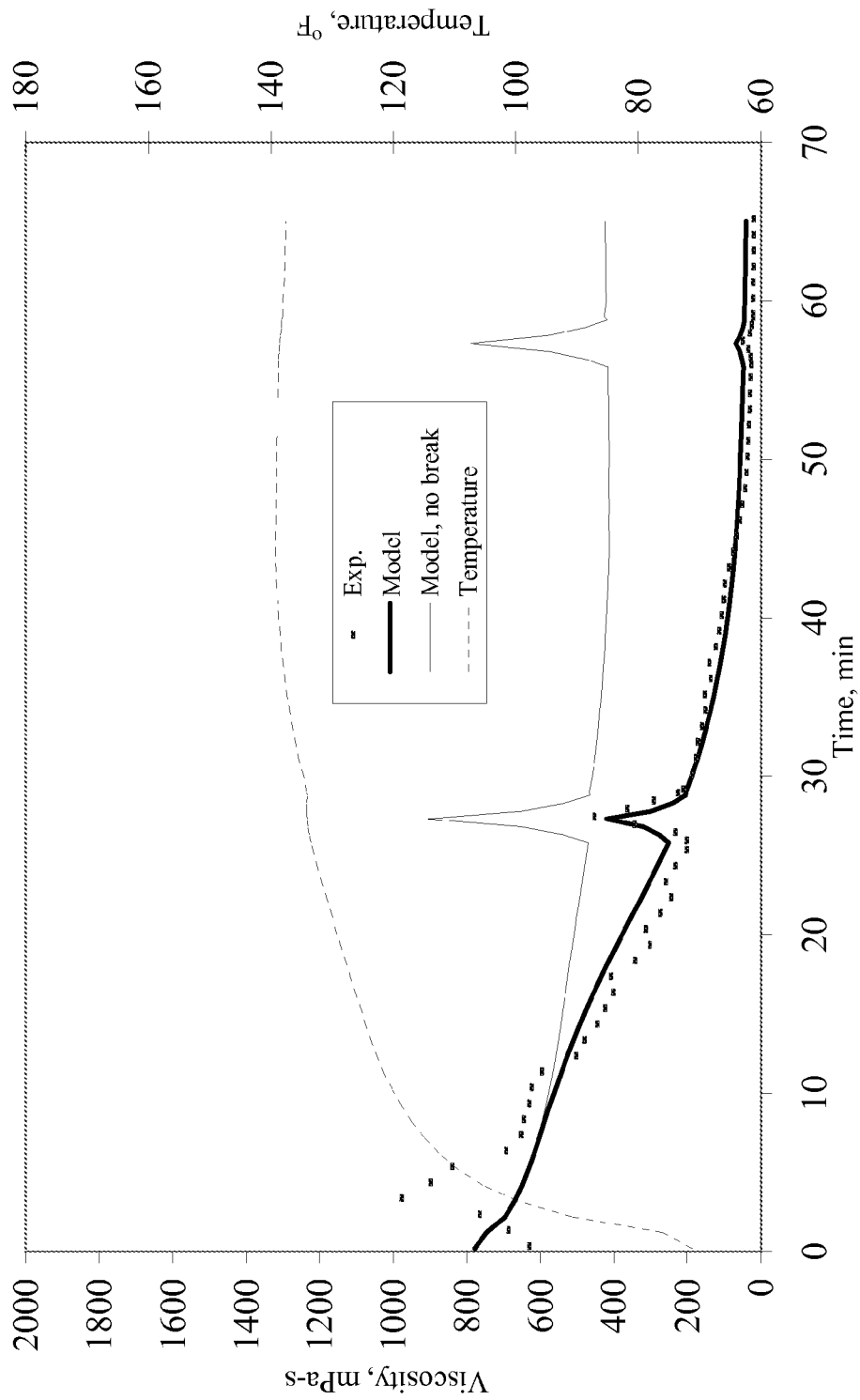
FIG. 5 is a plot of experimental and simulated rheology for a fluid containing 24.9 ppt guar polymer, 2.2 gpt borate crosslinker solution, 1.1 ppt ammonium persulfate and 0.5 gpt triethanolamine solution

For systems containing breaker, the model was examined against 42 Fann 50 experiments containing 15-40 ppt guar polymer, 1.1-4.4 gpt of a 20% by weight aqueous solution of borax, 0.6-2.2 ppt ammonium persulfate breaker, and 0.3-1.0 gpt triethanolamine. 35 of these (83%) are successfully represented by the model. Performance examples at high- and low temperature are shown in FIGS. 4 and 5.

Figure 6:
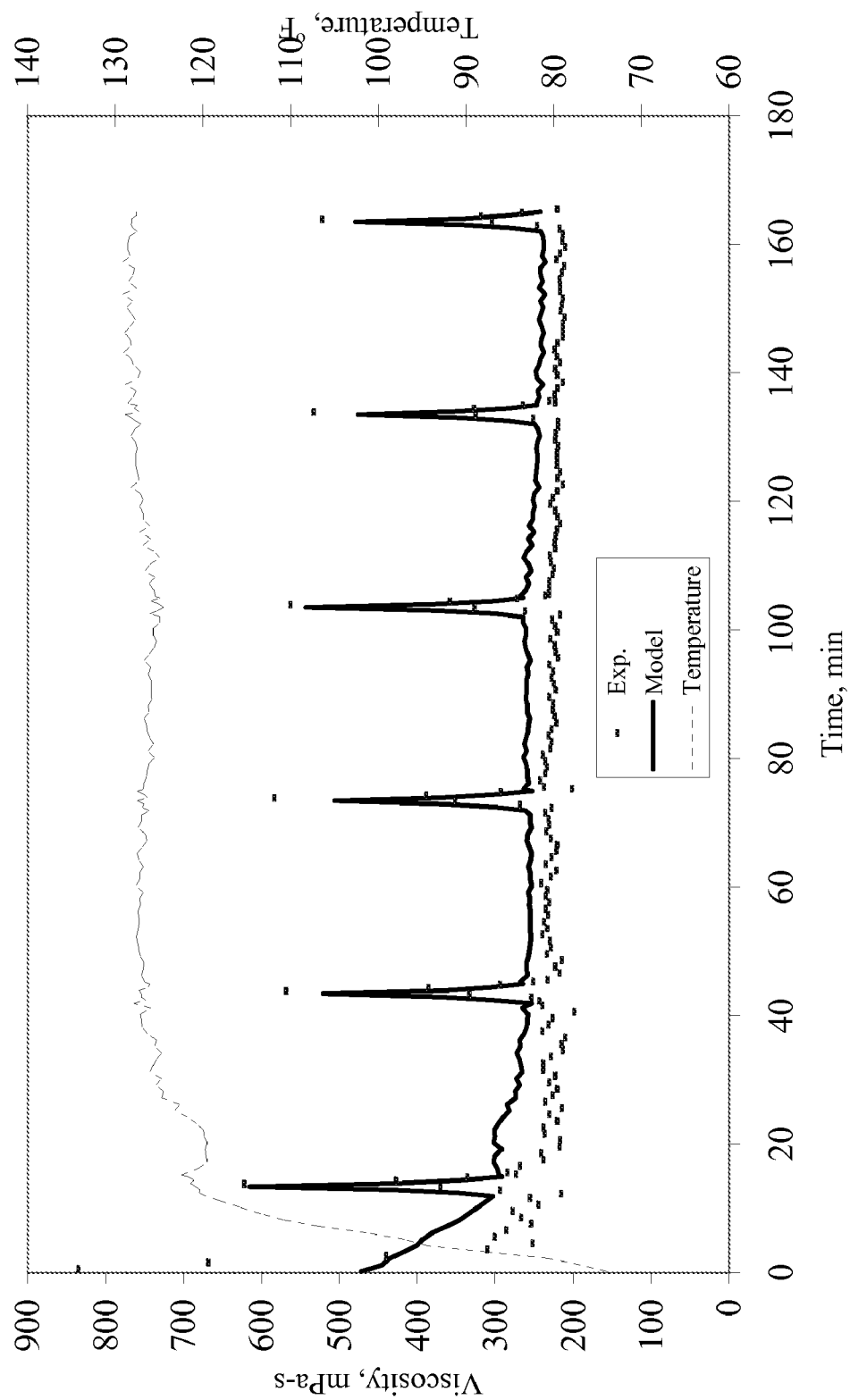
FIG. 6 shows calculated versus experimental viscosities during a Fann 50 experiment where the spikes correspond to the shear ramps, where the shear rate is ramped down from $100 \text{ s}^{-1}$ (base) to $25 \text{ s}^{-1}$ and back up to the base shear rate.
Figure 7:
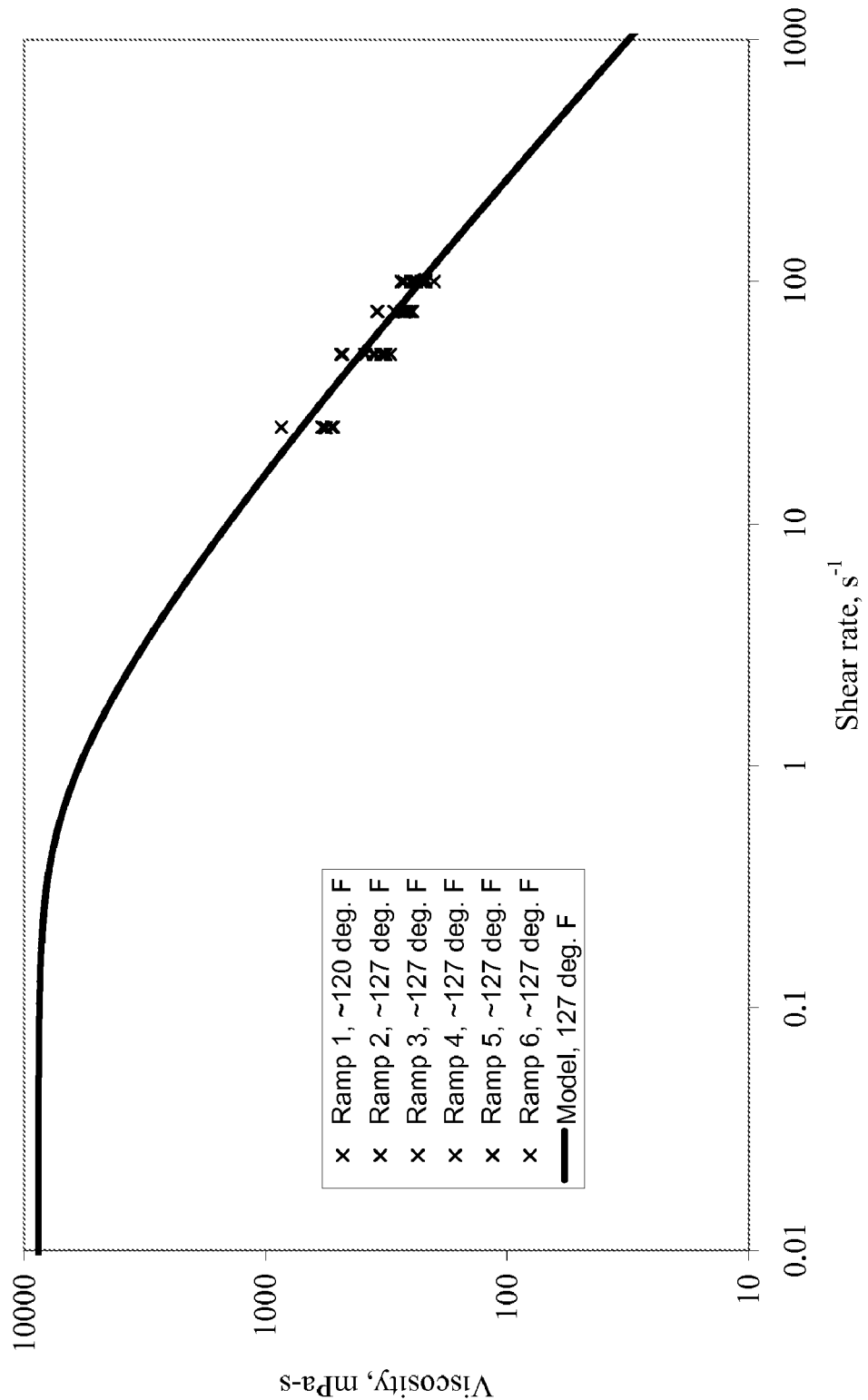
FIG. 7 illustrates experimental and calculated viscosity profiles for the Fann 50 experiment shown in FIG. 6.
Figure 8:
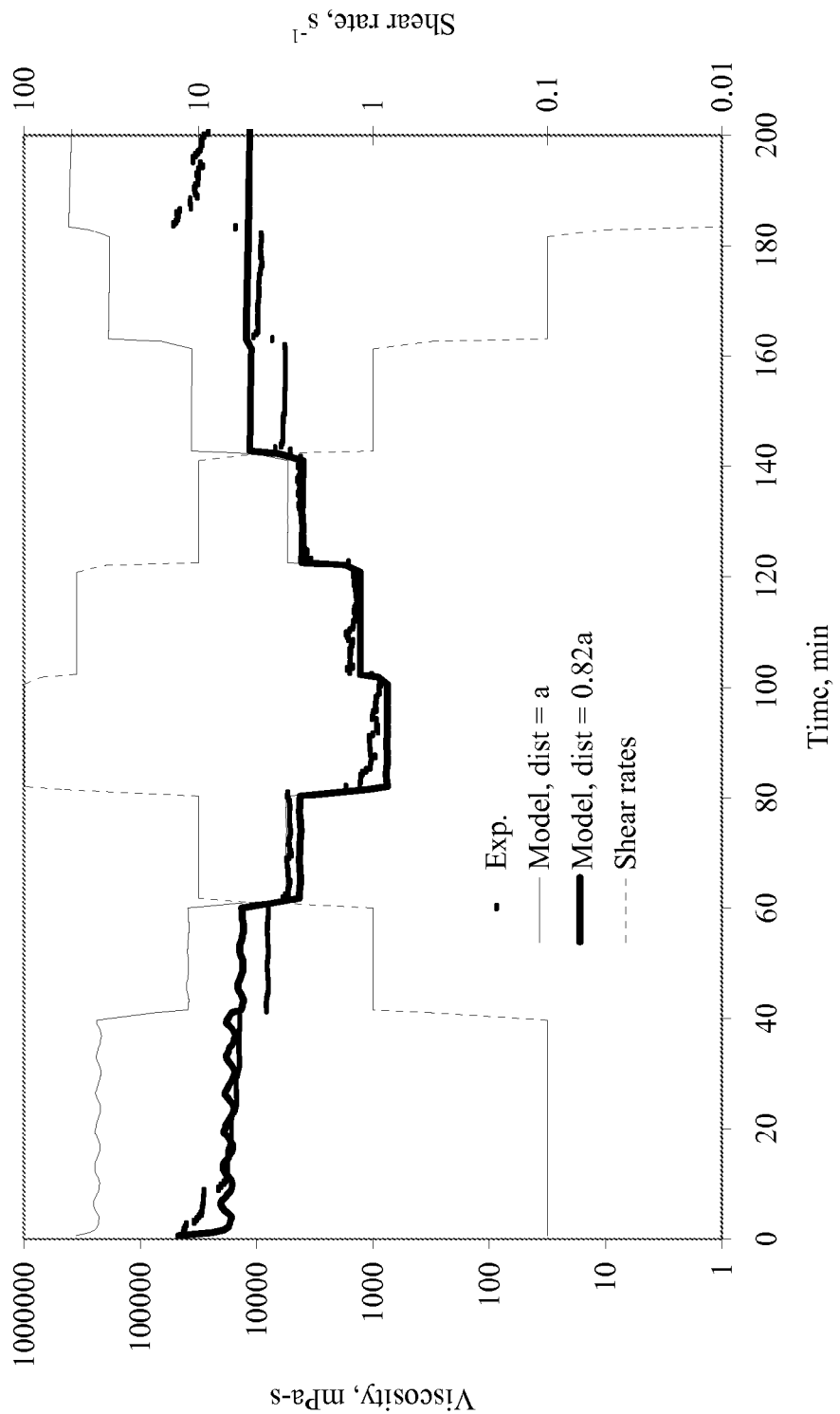
FIG. 8 is a plot of calculated vs. experimental viscosities during a low-shear rheology experiment for a gel containing 30 ppt guar polymer and 3.6 gpt borate crosslinker solution at 125° F.
Figure 9:
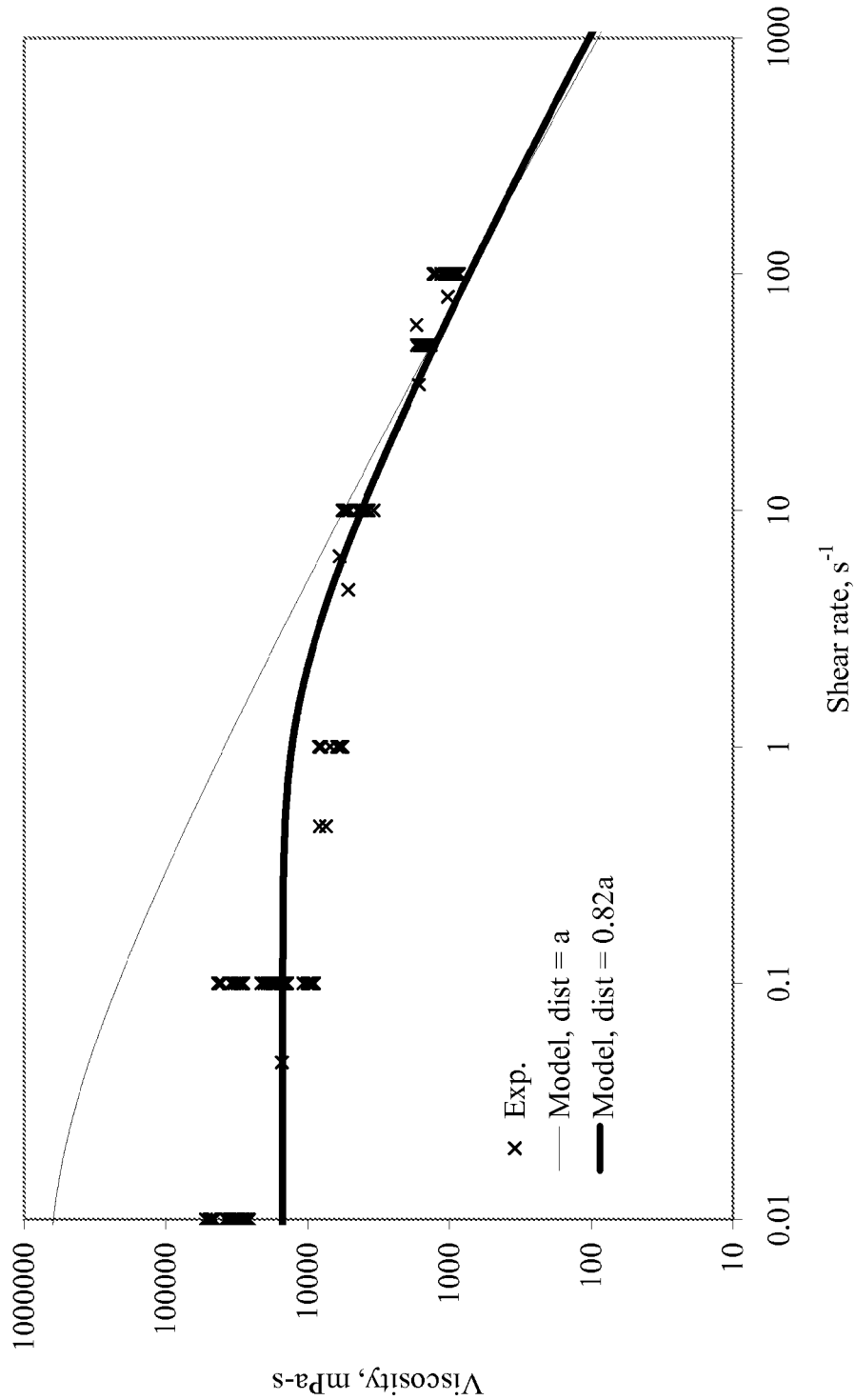
FIG. 9 is a plot of calculated vs. experimental viscosities profiles for a gel containing 30 ppt guar polymer, 3.6 gpt borate crosslinker solution at 125° F.

For shear dependence correlation trends, the model was examined against 188 Fann 50 shear ramps for non-broken gels. These ramps are measured during a standard Fann 50 experiment, where the shear rate is ramped down from the base shear rate $100\ s^{-1}$ to $25\ s^{-1}$ and back up to the base shear rate. This technique can be found in API Recommended Practice 39, entitled "Recommended Practices on Measuring the Viscous Properties of a Cross-linked Water-based Fracturing Fluid", dated May 1998. The Eyring model can not predict shear thickening, so ramps indicating shear thickening were excluded from this investigation. The average deviation between calculated and experimental viscosities was 80 mPa-s. A performance example is shown in FIGS. 6 and 7. At lower shear rates the model over predicts the viscosities, but this can be corrected for by introducing an empirical correction to the polymer-spacing parameter a, as shown in FIGS. 8 and 9.

These examples illustrate that a rheology model is enabled for borate crosslinked guar-based fracturing fluids. The model enables a prediction of the viscosity during a fracturing job. The foundation of the model is an explicit description of the reaction chemistry, which describes how the number of crosslinks and broken polymer linkages develops in time under the influence of crosslinkers, breakers and thermally induced effects. The viscosity predictions were successful for at least 84% of the data series investigated here. The average deviation between calculated and experimental viscosities was 80 mPa-s for 188 shear ramps between 100 and $25\ s^{-1}$. When used as a tool for simulating the fluid viscosity, the model can help optimizing the fluid design and breaker schedule for a hydraulic fracturing treatment.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A method for treating a subterranean formation penetrated by a wellbore, the method comprising:
   a. predicting a plurality of formation treatment scenarios for a treatment fluid comprising a polymer and a crosslinker using a fluid rheology model comprising:
      i. inputting a concentration of polymer and a concentration of crosslinker,
      ii. inputting temperature, formation pressure, and shear rate profiles over the course of the treatment,
      iii. determining a concentration of crosslinks over the course of the treatment based upon the input values from i. and ii, and
      iv. determining the fluid rheology over the course of the treatment based on the concentration of crosslinks over the course of the treatment;
   b. selecting a treatment scenario from the plurality of formation treatment scenarios which provides fluid rheology properties during the course of treatment;
   c. preparing and injecting the treatment fluid into the wellbore; and,
   d. treating the subterranean formation.

2. The method of claim 1 further comprising inputting a concentration of breaker.

3. The method of claim 1 further comprising inputting the concentration of one or more pH modifiers over the course of the treatment.

4. The method of claim 1 wherein in the selection of a treatment scenario is based upon incorporating a concentration of polymer.

5. The method of claim 4 wherein in the selection of a treatment scenario is based upon incorporating a concentration of polymer and optimal clean-up after treatment.

6. The method of claim 1 further comprising inputting a concentration of a crosslinking delay agent over the course of the treatment.

7. The method of claim 1 further comprising monitoring the treatment fluid and evaluating the fluid performance downhole based upon real-time monitoring of the fluid composition at the surface.

8. The method of claim 1 further comprising inputting fluid pumping rate, wellbore configuration, and fluid travel time to a treatment zone.

9. The method of claim 1 as used in a hydraulic fracturing simulator whereby fluid rheology is calculated to simulate the fracture placement and an optimal pumping sequence is determined.

10. The method of claim 1 wherein the fluid rheology is determined by coupling irreversible reactions that the polymer undergoes caused by thermal effects or by oxidizing or enzyme agent, with equilibrium reactions of the crosslinker and polymer as a function of time, temperature, pressure, polymer concentration, and crosslinker concentration.

11. The method of claim 1 as used for fracturing a subterranean formation.

12. The method of claim 1 as used for monitoring fluid placement during a treatment selected from the group consisting of fracturing treatments, acidizing treatments, wellbore cleanout operations, gravel packing operations, acid diversion treatments, and fluid loss control operations.

13. The method of claim 1 wherein the polymer is selected from the group consisting of guar, hydropropyl guar (HPG), carboxymethyl guar (CMG), carboxymethylhydroxypropyl guar, cellulose, hydroxyethylcellulose (HEC), hydroxypropylcellulose (HPC), carboxymethylhydroxyethylcellulose (CMHEC), xanthan, diutan, whelan gum, polyacrylamide, polyacrylate polymers, and wherein the crosslinker is a zirconium, titanium or borate based crosslinker.

14. The method of claim 1 wherein the polymer is guar and the crosslinker is a borate based crosslinker.

15. The method of claim 1 further comprising considering pressure effects on the effectiveness of a borate based crosslinker in determining the fluid rheology over the course of the treatment.

16. The method of claim 1 wherein the concentration of crosslinks is about $5 \times 10^{-8}$ mole/L or greater.

17. The method of claim 1 wherein the fluid further comprises a proppant, and concentration of the proppant is inputted into the model.

18. The method of claim 1 wherein the concentration of polymer ranges from about 15 to about 40 pounds per thousand gallons.

19. The method of claim 1 wherein the concentration of polymer is about 15 pounds per thousand gallons or less.

20. A method for treating a subterranean formation penetrated by a wellbore, the method comprising:
   a. predicting a plurality of formation treatment scenarios for a fluid comprising a polymer, using a fluid rheology model comprising:
      i. inputting a concentration of polymer,
      ii. inputting temperature, formation pressure and shear rate profiles over the course of the treatment, and
      iii. determining the fluid rheology over the course of the treatment by considering concentration of polymer, and temperature, pressure and shear rate profiles over the course of the treatment;

b. selecting a treatment scenario from the plurality of formation treatment scenarios which provides fluid rheology properties during the course of treatment;

c. preparing and injecting the treatment fluid into the wellbore; and, d. treating the formation.

* * * * *